Nov. 12, 1957  M. K. COSKUN  2,812,831
ROTOR BRAKE ACTUATOR AND AUTOMATIC SLACKS ADJUSTER THEREFOR
Filed Aug. 28, 1953  2 Sheets-Sheet 2
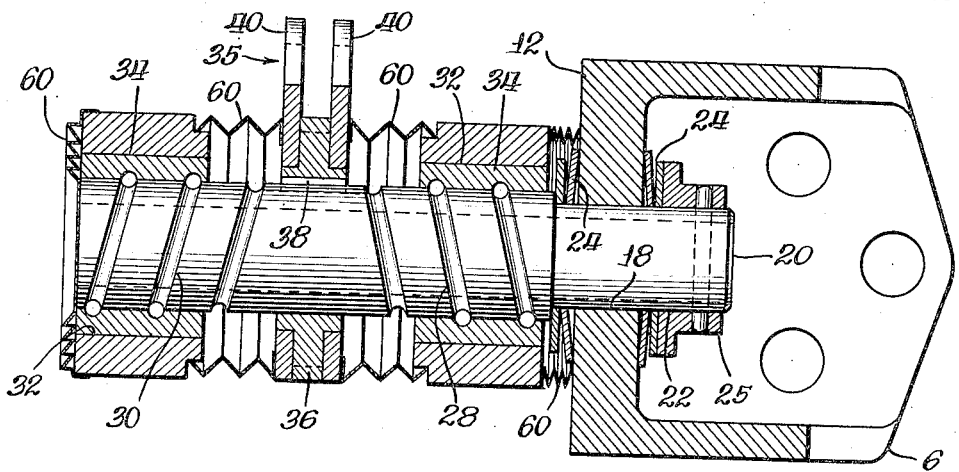
Fig. 3.
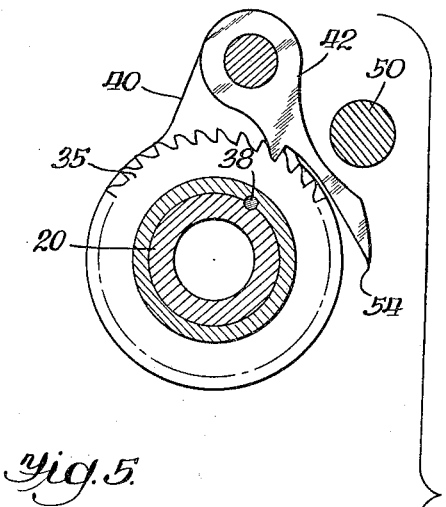
Fig. 5.
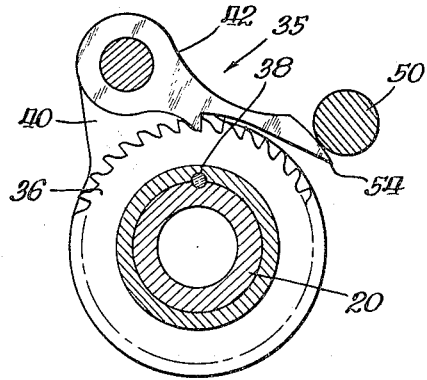
Fig. 4.
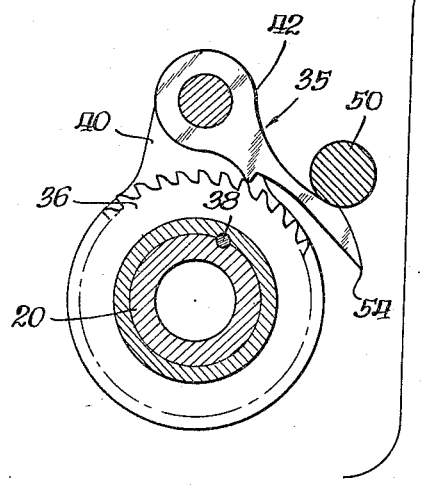
INVENTOR.
Mehmet K. Coskun
BY
O. B. Garner
Atty United States Patent Office 2,812,831
Patented Nov. 12, 1957

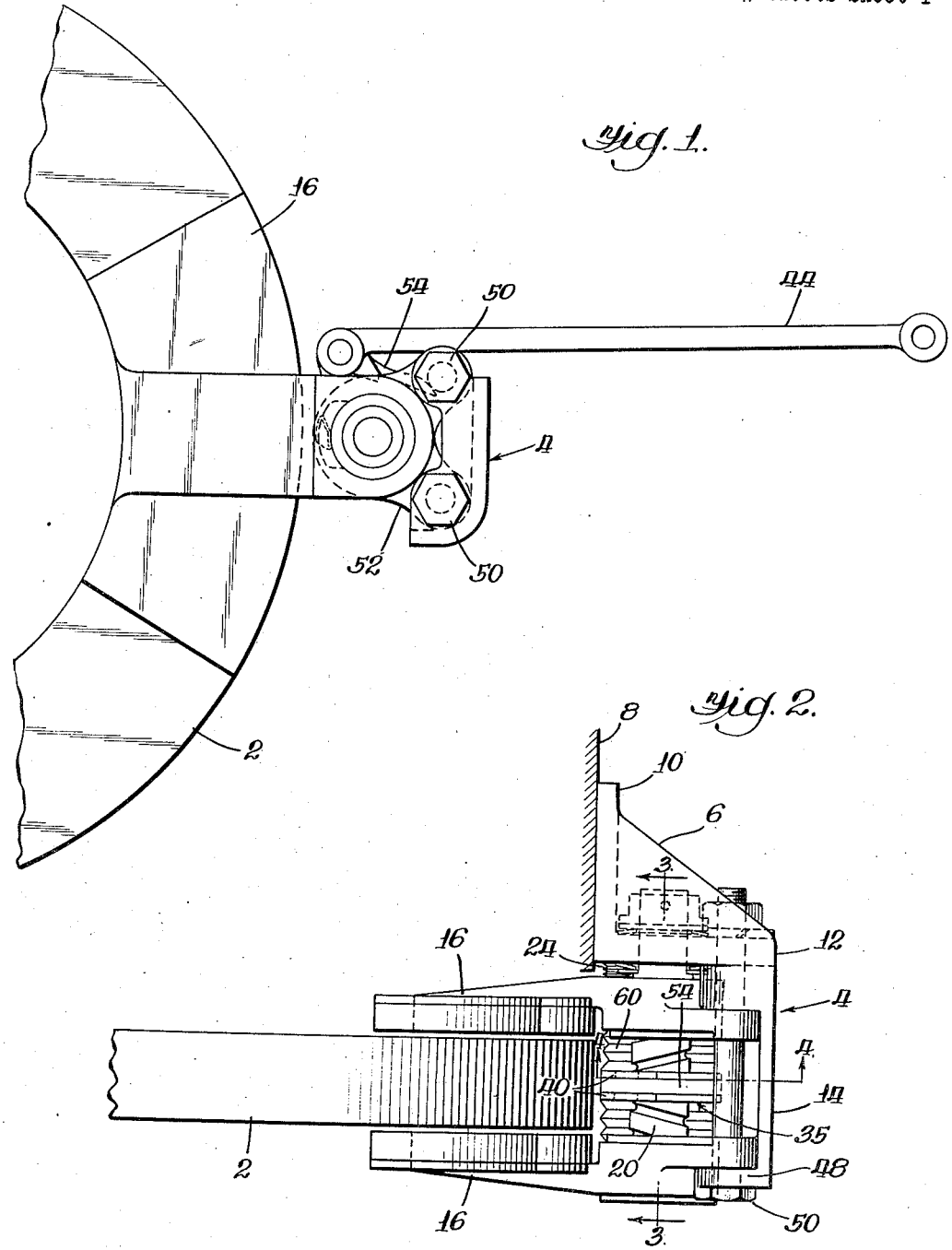

2,812,831
ROTOR BRAKE ACTUATOR AND AUTOMATIC SLACK ADJUSTER THEREFOR

Mehmet K. Coskun, Granite City, Ill., assignor to American Steel Foundries, Chicago, Ill., a corporation of New Jersey Application August 28, 1953, Serial No. 377,015

8 Claims. (Cl. 188—59)

The invention relates to a novel brake arrangement to be employed on railed vehicles and more particularly to a novel brake actuation device therefor.

It is a principal object of the invention to utilize a screw arrangement to actuate a railroad braking device preferably a rotor brake.

It is another object of the invention to provide a novel mounting arrangement for the brake of the type described whereby relative lateral movement between the rotor and brake carrying frame will be accommodated during brake application.

It is a further object of the invention to provide a novel self-adjusting actuating mechanism for the brake of the type described, whereby brake shoe wear is automatically accommodated.

These and other objects of the invention will become apparent in the course of the following description and from an examination of the concerned drawings, wherein:

Figure 1 is a fragmentary side elevational view of the brake arrangement,

Figure 2 is a fragmentary top plan view of the brake arrangement, certain details being omitted for the sake of clarity, Figure 3 is a sectional view taken along lines 3—3 of Figure 2, Figure 4 is a sectional view taken along lines 4—4 of Figure 2, and Figure 5 consists of fragmentary views illustrating the matter of operation of the ratchet mechanism.

Describing the invention in detail and referring first to Figure 1, it will be seen that a rotor 2 is provided which may be mounted in any conventional manner on a rotatable axle (not shown) of a railway car truck or on a drive shaft (not shown) of a power source such as an electrical motor when same is employed to furnish a direct mechanical drive for a related vehicle. The rotor 2, of course, is rotatable and vehicle braking is provided by the engagement with the rotor of a plurality of brake shoes which embrace and are caused to engage the rotor upon actuation of the braking mechanism. In the preferred embodiment the braking device indicated generally at 4 consists of a mounting bracket 6, said bracket being secured to the truck frame, indicated at 8 in any convenient manner such as by bolting or welding. The mounting 6 is so positioned on the frame as to carry the brake arrangement 4 in proper position relative to the rotor 2. In the preferred embodiment the mounting 6 comprises a base plate 10 and a mounting plate 12 disposed in perpendicular relation to each other. A backing plate 14 extends perpendicularly from the mounting plate 12 and provides means to support the shoe carrying brake arms 16, 16.

Referring to Figure 3 it will be seen that the mounting plate 12 is provided with an opening 18 which receives a screw 20, said screw being preferably of the ball bearing type. The screw 20 presents at one end thereof a cylindrical portion 22 which is disposed within the aperture 18 and carries on opposite sides of the plate 12 Belleville springs indicated at 24, 24. The screw 20 is secured to the mounting plate 12 by means of the pinned cap 25 which is secured to the extremity of the cylindrical portion 22. The screw 20 extends outwardly from the mounting plate 12 and comprises screwlike ball bearing races formed peripherally on the screw 20. It will be noted that the inboard race 28 is cut oppositely from the outboard race 30. A plurality of ball bearings are disposed within the races 28 and 30 thus affording the ball bearing screws which is well known to those skilled in the art. The brake arms 16, 16 are provided with apertures 32, 32 at adjacent ends thereof, said apertures receiving the rigidly attached bearing inserts 34, 34. The bearing inserts 34 are provided with ball bearing races similar to those provided on the screw 20. The races on the brake arms 16, 16 receive the ball bearings provided in the races on the screw 20, one brake arm 16 being operatively connected to the inner ball bearing race 28 and the other brake arm 16 being operatively connected to the outer ball bearing race 30.

An actuating device 35 is provided for the screw 20 centrally thereof as seen in Figure 3. Directing attention to Figure 4, it will be seen that the actuating device comprises a ratchet 36 which is sleeved over and centrally located on the screw 20 and is fixedly secured to the screw in any suitable manner as, for example, by the key 38. The ratchet rotatably receives and mounts a pair of arms 40, 40, said arms extending from the ratchet 36 in perpendicular relation to the screw 20. As noted the arms 40, 40 are normally freely rotatable on the ratchet 36 whereby movement of the arms 40 has no effect on the screw 20. A pawl 42 is pivotally connected to the arms 40, 40 and disposed intermediate thereof. The pawl 42 is free to engage the teeth on the ratchet 36 whereby the arms 40 become mechanically interlocked with the ratchet 36. Thus, upon clockwise movement of the arms 40, the pawl 42 will engage the ratchet 36 whereby the screw 20 will be urged to rotate. Rotation of the screw in a clockwise direction as seen in Figure 4 will urge the brake arms 16, 16 to clasp the rotor 2 whereby friction engagement between the carried brake shoes and the rotor causes the desired braking effect. The arms 40, 40 may be actuated by the link 44 (Figure 1), said link being pivotally connected to said arms 40 at one end thereof and operatively connected at the other end thereof to any suitable actuating device such as a brake air cylinder (not shown), as will be well understood by those skilled in the art.

Directing attention to Figures 1 and 2, it will be seen that the backing plate 14 which extends outboardly from the mounting plate 12 is provided with an end plate 48, said end plate being provided with apertures whereby bolts 50, 50 may be secured to the end plate 48 and the mounting plate 12. The end plate 48 serves as a convenient mounting for the bolt 50 and also serves to maintain the brake arms 16, 16 in assembled relation in the braking device 4. Each brake arm 16 is provided with upper and lower positioning arms 52, 52, said positioning arms 52 having apertures which receive the bolts 50, 50 thus providing guides for the brake arms 16 during the movement heretofore mentioned.

Considering now the adjusting feature of the novel brake arrangement it will be seen that the pawl 42 is provided with an extending cam 54, said cam being slidably engageable with the central portion of the upper bolt 50 as is best seen in Figures 1 and 4. Upon clockwise movements of the arms 40, the cam 54 is urged to slide along the surface of the bolt 50 and to maintain the pawl 42 in operative engagement with the ratchet 36. During normal operation the arms 40 are rotated clockwise and the shoes are brought into engagement with the rotor. Upon release of the braking mechanism the arms 40 are urged to rotate counterclockwise and the engagement between the cam 54 and the bolt 50 maintains the pawl 42 in operative engagement with the ratchet 36, whereby the screw 20 is rotated counterclockwise and the brake arms 16 are brought out of engagement with the rotor 2.

As the carried brake shoes begin to wear after repeated engagement with the rotor 2, the arms 40 are urged to rotate a substantially increased distance in the clockwise direction in order to cause engagement between the shoes and the rotor. As this rotation is increased the cam 54 of the pawl 42 is carried out of engagement with the bolt 50 during the actuation part of the cycle. This sequence is illustrated in Figure 5. When the cam 54 during actuation is separated from the bolt 50 a maximum predetermined distance it will, upon de-actuation and counterclockwise movements of the arms 40, allow the pawl 42 to skip one of the teeth of the ratchet 36, thus taking up a new position on the ratchet 36 to the effect that the brake arms 16 upon de-actuation are not returned to the same full released position. Thus the clearance between the carried brake shoes and the rotor 2 is adjusted automatically to compensate for excessive wear of the shoes.

Referring again to Figure 3 the Belleville springs 24 provide a laterally movable mounting for the screw 20. This structure enables the braking device 4 to accommodate slight relative lateral movement between the rotor 2 and the frame 8 during braking engagement between the rotor and the frame carried brake shoes. It should also be noted that bellows 60 are provided at critical points to completely seal the ball bearing screw and thus prevent foreign matter from fouling the device while still accommodating necessary movements.

Thus it will be seen that the invention provides a novel brake arrangement utilizing a ball bearing screw to actuate carried brake shoes, said arrangement incorporating a novel adjusting mechanism whereby brake shoe wear is automatically accommodated.

I claim:

1. In a brake arrangement for a rail vehicle, a rotor, a brake mechanism adjacent thereto, said mechanism comprising a mounting, a screw movably carried by the mounting, brake means operatively carried by the screw and disposed on opposite sides of the rotor, actuating means to rotate said screw whereby said brake means are urged to engage the rotor, said actuating means comprising a ratchet non-rotatably secured to the screw, actuating arms rotatably carried by the ratchet, a pawl pivotally carried by the actuating arms and operatively engageable with the ratchet, adjusting means cooperatively associated with the pawl to maintain the pawl in operative engagement with said ratchet and to allow movement of the pawl relative to the ratchet whereby brake shoe wear is automatically accommodated, and springs interposed between the screw and the mounting accommodating relative movement between said screw and mounting longitudinally of the former.

2. A brake arrangement for a rail vehicle according to claim 1, wherein said adjusting means comprises a cam on the pawl and a follower on the mounting engageable with said cam.

3. In a brake arrangement, a movable friction surface, a shoe carrying brake arm, a rotatable actuating member, interengaging screw means on the arm and member, and means to rotate said member whereby the arm is urged toward the surface, said means comprising a ratchet on the member, a movable pawl engageable with the ratchet, and cam means to maintain the pawl engaged with the ratchet during normal operation and to accommodate adjustment of the pawl relative of the ratchet upon predetermined abnormal operation.

4. In a brake arrangement, a rotor, a mounting bracket, a screw movably carried by the bracket, brake means operatively carried by the screw and disposed on opposite sides of the rotor, actuating means to rotate said screw whereby said brake means are engaged with the rotor, said actuating means comprising a ratchet fixed to the screw, actuating arms rotatably carried by the bracket, a pawl pivotally carried by the actuating arms, adjustment means cooperatively associated with the pawl to maintain said pawl in operative engagement with the ratchet and to allow movement of the pawl relative to the ratchet whereby brake shoe wear is automatically accommodated, and resilient means interposed between the screw and the mounting bracket accommodating longitudinal movement of the screw relative to the mounting bracket.

5. In a brake arrangement, a rotor, a pair of shoe carrying brake arms embracing said rotor, screw means operatively associated with said arms to urge said arms to engage and disengage said rotor, and slack adjusting means comprising a ratchet fixedly mounted on said screw means, a movable pawl engageable with said ratchet and having thereon a cam surface, a follower continually engaged with said surface when no adjustment is required, and disengaged to permit relative movement of said ratchet and said pawl when adjustment is required.

6. In a brake arrangement, a movable friction surface, a shoe carrying brake arm, a rotatable actuating member, interengaging screw means on the arm and member, and means to rotate said member whereby the shoe is caused to engage the surface, said means comprising a ratchet on the member, a movable pawl engageable with the ratchet, and cam means operatively engageable with the pawl to maintain the pawl engaged with the ratchet during normal operation and to permit disengagement and adjusting movement of the pawl relative to the ratchet upon predetermined abnormal operation.

7. An adjusting device for a screw actuated rotor brake comprising a ratchet, a movable pawl engageable with said ratchet, and cam means operatively engageable with the pawl to maintain the pawl engaged with the ratchet during normal operation, and to accommodate adjustment of the pawl relative to the ratchet upon predetermined abnormal operation.

8. An adjusting device for a screw actuated rotor brake comprising driving means fixedly attached to the screw, an arm rotatable relative to said driving means, a lever pivotally attached to said arm and cooperatively associated for rotation with said driving means, and cam means operatively engageable with the lever to maintain said lever in cooperative association with said driving means during normal operation and to accommodate adjustment of the lever relative to the driving means upon predetermined abnormal operation.

References Cited in the file of this patent

UNITED STATES PATENTS

| | | |
|---|---|---|
| 1,265,512 | Porter | May 7, 1918 |
| 1,434,678 | Chandeson | Nov. 7, 1922 |
| 1,614,976 | Wrenn | Jan. 18, 1927 |
| 1,695,665 | Rueppel et al. | Dec. 18, 1928 |
| 2,045,593 | Frankland | June 30, 1936 |
| 2,109,637 | Gulkaiss | Mar. 1, 1938 |
| 2,379,796 | Freeman et al. | July 3, 1945 |
| 2,429,693 | Kelly | Oct. 28, 1947 |

FOREIGN PATENTS

| | | |
|---|---|---|
| 405,958 | Great Britain | Feb. 5, 1934 |